(12) United States Patent
Fenney

(10) Patent No.: US 6,819,319 B1
(45) Date of Patent: Nov. 16, 2004

(54) SHADING THREE DIMENSIONAL COMPUTER GRAPHICS IMAGES

(75) Inventor: Simon J. Fenney, St. Albans (GB)

(73) Assignee: Imagination Technologies Limited, Hertfordshire (GB)

( * ) Notice: Subject to any disclaimer, the term of this patent is extended or adjusted under 35 U.S.C. 154(b) by 0 days.

(21) Appl. No.: 09/486,012
(22) PCT Filed: Aug. 19, 1998
(86) PCT No.: PCT/GB98/02488
§ 371 (c)(1), (2), (4) Date: May 15, 2000
(87) PCT Pub. No.: WO99/09523
PCT Pub. Date: Feb. 25, 1999

(30) Foreign Application Priority Data

Aug. 20, 1997 (GB) .............................................. 9717656

(51) Int. Cl.[7] .............................................. G06T 15/60
(52) U.S. Cl. ...................................................... 345/426
(58) Field of Search ................................ 345/426, 421, 345/418, 419, 582, 583, 584, 420, 422; 382/154

(56) References Cited

U.S. PATENT DOCUMENTS

| 4,928,250 | A | * | 5/1990 | Greenberg et al. | ........... 345/426 |
|---|---|---|---|---|---|
| 5,043,922 | A | * | 8/1991 | Matsumoto | ................... 345/422 |
| 5,369,737 | A | * | 11/1994 | Gholizadeh et al. | ......... 345/426 |
| 5,412,563 | A | * | 5/1995 | Cline et al. | ................... 345/420 |
| 5,596,685 | A | | 1/1997 | Ashton | ......................... 345/421 |
| 5,729,672 | A | | 3/1998 | Ashton | ......................... 345/589 |
| 5,754,680 | A | * | 5/1998 | Sato et al. | .................... 382/154 |
| 5,949,424 | A | * | 9/1999 | Cabral et al. | ................ 345/426 |
| 6,061,065 | A | * | 5/2000 | Nagasawa | ..................... 345/427 |
| 6,151,029 | A | * | 11/2000 | Shirman et al. | ............. 345/428 |
| 6,552,726 | B2 | * | 4/2003 | Hurley et al. | ................ 345/426 |

FOREIGN PATENT DOCUMENTS

| EP | 0 764 921 | 3/1996 |
|---|---|---|
| WO | WO 95/27268 | 10/1995 |

* cited by examiner

Primary Examiner—Wilson Lee
Assistant Examiner—Huedung X. Cao
(74) Attorney, Agent, or Firm—Flynn, Thiel, Boutell & Tanis, P.C.

(57) ABSTRACT

A three dimensional textured computer graphic image is shaded by firstly providing data which defines the computer graphic image. Textured data is then applied to that image. A set of surface normal vectors corresponding to the texture data are then applied to the image and data defining at least one light source which illuminates the image is also provided. For each pixel in the image a shading value is derived to be applied to that pixel from the set of surface normal vectors and the light source data.

20 Claims, 3 Drawing Sheets

SHADING THREE DIMENSIONAL COMPUTER GRAPHICS IMAGES

FIELD OF THE INVENTION

This invention relates to the shading of three dimensional computer graphic images, and especially to graphic images generated in real time.

BACKGROUND OF THE INVENTION

Many three dimensional computer graphics images are modelled with perfectly flat or smooth surfaces. Usually these surfaces are constructed from a plurality of small triangles to which is applied either flat shading, or smooth shading as described in "Transactions on Computers" IEEE-20 (6) June 1971 pp 623 to 629 by Gouraud, H., graduated shading, or, less frequently Phong shading from CACM 18(6)June 1975 pp 311 to 317 "Illumination for Computer Generated Pictures". Visual detail may be applied to these surfaces via the application of textures. These textures are generally two dimensional images and the process is similar to having an image painted onto a perfectly smooth wall. It does not model any surface roughness or any shading effects which might arise therefrom.

In computer graphics the way in which light interacts with the surface is referred to as shading. One of the simpler models used for shading is known as Lambert or diffuse shading. It is computed as a function of the direction of the light illuminating the surface and the orientation of that surface. The orientation is represented by a unit vector perpendicular to the surface (a surface normal). The light direction is also preferably assumed to be a unit vector which points from the surface to the point of illumination. In the case of flat shading the surface normal is considered to be constant across the entire surface. With Gouraud shading three surface normals defined at the vertices of each triangle are used. The shading at the vertices of the triangles is calculated from these normals. These shading values are then interpolated across the entire surface. This is a satisfactory approximation in many cases. However, it does lead to shading problems such as mach banding and problems with specular highlights.

Phong shading gives a superior result to this because it interpolates the surface normally across the triangle and then recalculates the shading at each pixel. However, both of these per pixel operations are considered to be relatively expensive computationally and, therefore, Gouraud shading is therefore more commonly used.

3D computer graphics often makes use of specular shading in addition to diffuse lighting. Specular shading is the modelling of glossy reflections of lights. In both types of shading a common basis for the calculation of the shading to be applied is a vector dot product raised to a power. This is shown in equation 1 below.

$$((1-h)+h.\vec{D}_{light}.\vec{D}_{normal})^P$$

In "simulation of wrinkled surfaces" by Blinn, J. F. in Siggaph 1978 pp 286 to 292 there is proposed the concept of bump mapping. This uses an adaptation of texturing to deviate surfaces normal on a pixel by pixel basis. The texture data used to form the derivation of the normal is referred to as the bump map.

Although the position of the surface is not actually moved in 3D graphic space it appears rough because shading is performed with a surface normal which moves in direction as the surface is traversed.

This process is known as surface normal perturbation. What is stored in the bump map is an amount by which the surface normal is to deviate from its previous value. Thus, in order to compute the shading applied to a surface it is necessary to retrieve data about the deviation of the surface normal from the bump map prior to applying this deviation to the surface normal. The surface normal then has to be renormalised in dependence on the orientation of the surface to which it is applied. The shading calculation is then performed.

The effect of this leads to realistic dynamic changes in shading as a light source moves relative to the surface. However, computationally the scheme is approximately the same as that of Phong shading and so to date has been restricted to non-real time applications.

SUMMARY OF THE INVENTION

We have appreciated that an effect similar to that proposed by Blinn can be implemented with much less computational power thus enabling realistic changes of shading to be implemented in real time.

Preferably this is implemented in addition to the usual 3D computer graphics rendering systems which are in common usage for texturing and shading.

Preferably, after a surface has been rendered, the bump map effects are applied as an additional pass over the surface. For each image element or pixel, a bump map texture element is obtained in a way identical to the usual texturing operation. Lighting values are also interpolated across the surface on a pixel by pixel basis from the light sources in use. The lighting values for a particular pixel are combined with the bump map texel (texture element) to produce an alpha value and a colour and thereby look identical to the usual output of the texturing engine. These are then supplied to the usual blending units to apply the texture. Unlike the approach taken by Blinn, each texel of the bump map stores the actual direction of the surface normal after perturbation rather than the displacements of the surface normal. These normals are given in the surface's coordinate system which is preferably the polar coordinate system. Lighting values are similarly expressed in terms relative to the surface's coordinate system.

The invention is defined with more precision in the appended claims to which reference should now be made.

BRIEF DESCRIPTION OF THE DRAWINGS

A preferred embodiment of the invention will now be described in detail by way of example with reference to the accompanying drawings in which.

DETAILED DESCRIPTION

As described above this invention relates to computer 3D graphics rendering systems and is applicable but not restricted to hardware based rendering systems. A hardware based system is described here by way of example. The first embodiment of the invention shown in FIG. 1 comprises a modified conventional 3D rendering system. Conventional 3D texture hardware 2 is used to apply texture to the image and rending hardware 4 then shades the textured image. Conventionally a single connection is provided between these two hardware blocks.

Figure 1:
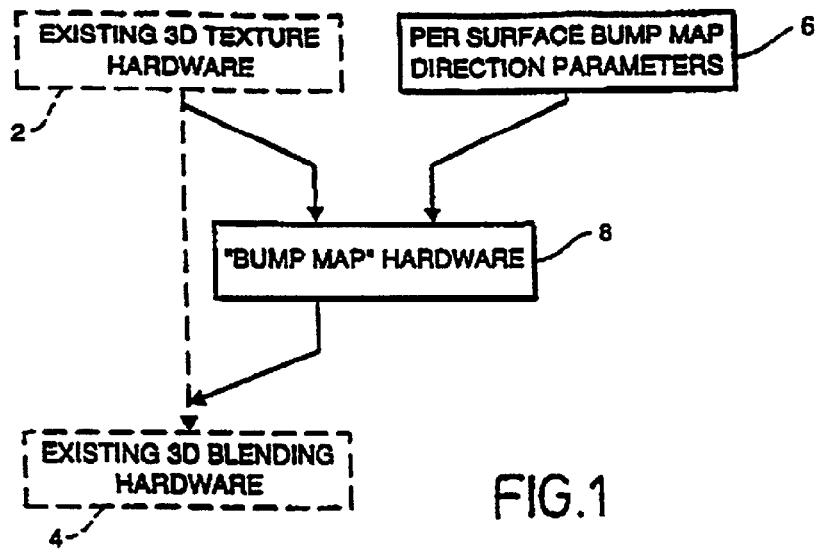
FIG. 1 is a block diagram of circuitry a first embodiment of the invention.

In the system of FIG. 1 a store 6 is used for surface bump map direction parameters for a number of different bump maps. This stores a set of surface normals pointing in different directions in dependence on their location in the bump map. These are called up by the bump map hardware 8 which combines the lighting values for a particular pixel with the bump map data from the store 6 to produce an alpha value and a colour. These are identical to the usual output of the 3D texture hardware 2 and are then supplied to the usual blending unit which uses the alpha value to combine the colour with existing colour at that pixel in proportions dependent on the alpha value (alpha is between 0 and 1).

Thus, the system applies surface normal perturbation effects to a surface as one additional single pass to modify the existing texturing and shading. When it is determined that, for a given surface and picture element "pixel" that a bump map pass is required, then the appropriate surface parameters are obtained for that surface. The surface normal for that pixel is determined by accessing the bump map texture associated with the surface in a similar manner to existing texture mapping methods. A direction parameter is also calculated for the pixel by interpolation. This is similar to the RGB interpolation performed for Gouraud shading. Thus the alpha value and colour value are supplied to the blending unit.

Figure 2:
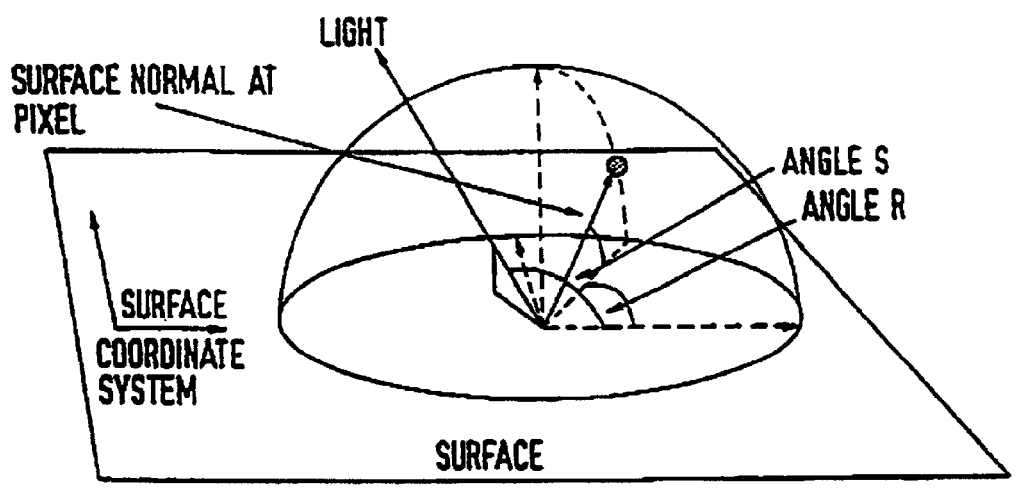
FIG. 2 is a schematic diagram showing the surface normal and its coordinate system.

The bump map surface normals stored in store 6 are encoded in polar coordinate as shown in FIG. 2. Angle S represents the elevation of the surface normal and goes from 0 to 90°. Angle R is the rotation of the surface normal and goes from 0 to 360°. As the surface normal is a unit vector, the length value is always 1, and so it is not required to store this. Thus a saving on memory is achieved.

In one embodiment of the invention, the per surface direction parameters for the lighting sources are also encoded in spherical coordinates with parameters T ranging from 0 to 90° and Q ranging from 0 to 360°. The dot product power function of equation 1 would then be implemented as shown below in equation 2.

$$((1-h)+h(\sin(S)\sin(T)+\cos(S)\cos(T)\cos(R-Q)))^P$$

The parameter h is a weighting value that lies in the range 0 to 1. The surface direction parameters T and Q can be interpolated in a manner similar to that used in Gouraud shading.

Another embodiment would include the T and H per surface direction parameters as parameters $k_1$, $k_2$, $k_3$ thus giving the dot product power function shown below in equation 3.

$$(k_1+k_2\sin(S)+k_3\cos(S)\cos(R-Q))^P$$

Typically these values would be calculated as shown below in equation 4.

$$k_1=(1-h); k_2=h\sin(T); k_3=h\cos(T);$$

This gives further flexibility as well as reducing the complexity of the implementation in hardware.

Figure 3:
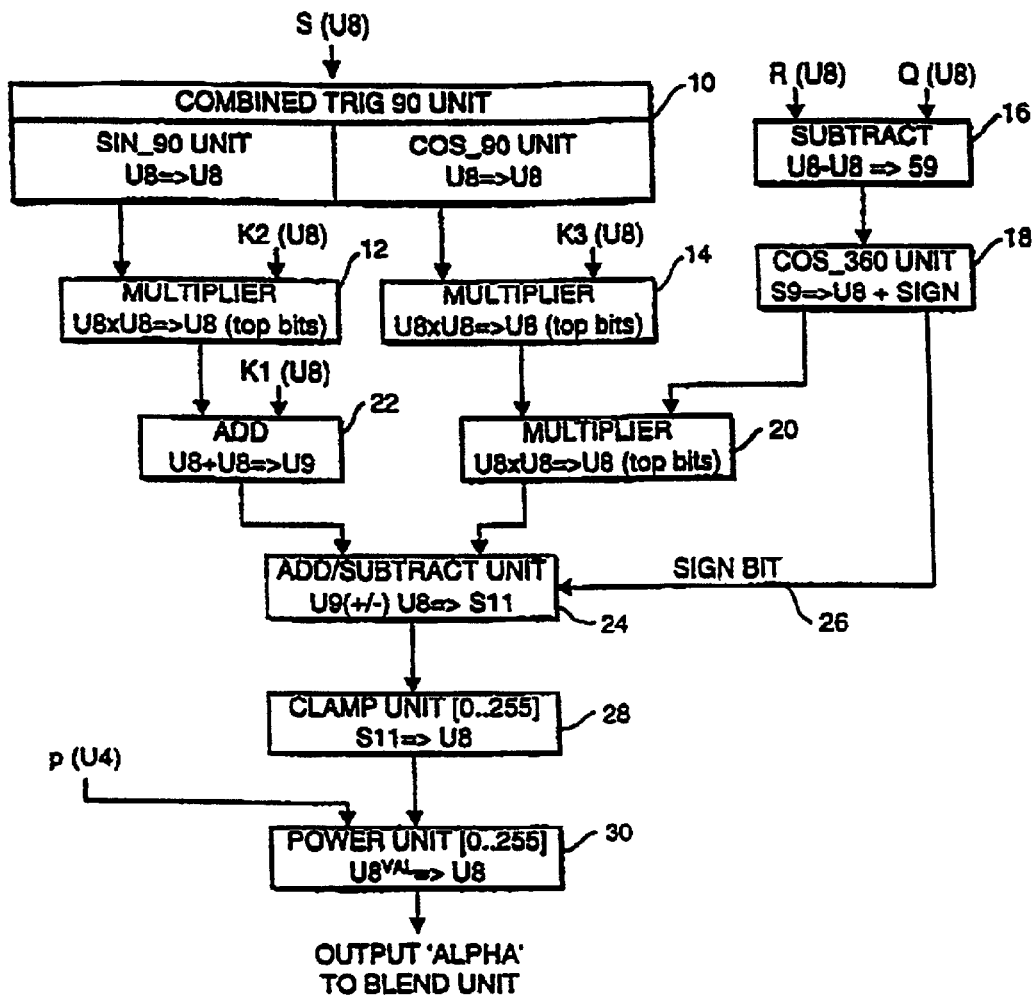
FIG. 3 is a block diagram of the bump map hardware of FIG. 1.

An embodiment of the invention using the equation shown in equation 3 is illustrated in FIG. 3.

The elevation angle S for the surface normal is first passed to a sine and cosine unit 10 which computes the sine and cosine of the elevation and applies these to multipliers 12 and 14 where they are combined with lighting parameters $k_2$ and $k_3$. At the same time, the rotation angle R of the surface normal has the rotation angle Q of the lighting value subtracted from it in subtracter 16. The cosine of this angle is then derived in cosine unit 18. The output of this unit is unsigned and is fed to a multiplier 20 where it serves to multiply the output of multiplier 14. The output of multiplier 12 is then passed to an adder 22 where it is added to lighting parameter $k_1$.

The output of adder 22 and multiplier 20 are then passed to an add/subtract unit 24. A signed bit 26 supplied by the cosine unit 18 determines if add/subtract unit 24 adds or subtracts the output of multiplier 20 from the output of adder 22. The output of add/subtract unit 24 is a signed 11 bit number which is supplied to a clamping unit 28 which reduces it to the range 0 to 255 (8 bits) and outputs this to a power unit 30 which raises its value to a power p which is supplied to the blend unit.

In this embodiment, the S and R values obtained from the bump map texture are both encoded as 8 bit unsigned numbers. For S 0 to 255 represents angles of 0 to almost 90° (256 would represent 90° exactly) while for R 0 to 255 represents angles of 0 to almost 360° (256 would represent 360° exactly).

The units of FIG. 3 show the number of bits and whether or not those integers are signed or unsigned. $U_x$ represents an unsigned x bit integer. While $S_x$ represents a signed x bit integer.

Thus, the alpha output to the blending unit is provided along with a colour from the existing 3D texture hardware 2. The existing colour and the new colour are then combined in the blending hardware 4 to produce a new value for that particular pixel.

Using this method has several advantages. Firstly, storage of surface normals as polar co-ordinates makes the bump map data compact compared to the method of Blinn which used surface normal displacements. Furthermore, renormalisation of the surface normals is not necessary because of the nature of storage as surface normals. Finally, interpolation of light direction is a relatively straight forward calculation to be performed since in most scenes there will only be a small number of light sources on which the lighting direction has to be based. This enables rendering to be performed in real time. The bump mapping technique described above has some shortcomings. These are:

1. Interpolation of the lighting direction given at each vertex is "tricky" as the direction is specified in polar coordinates. Although polar coordinates allow greater precision with the direction specification and do not need normalisation, to perform the interpolation requires significant modification to the iterator units. Because of this, the hardware can assume that the light direction is constant across each polygon. This effectively eliminates Phong shading.

2. For similar reason, bilinear texturing computations are more complicated. Although some modifications were made to perform angular bilinear, the actual results are not ideal.

3. The system cannot model light directions that are 'below' the horizon—these must be converted to an approximate direction that is on the horizon.

4. The software interface bears little resemblance to the actual hardware interface. This means extra work for the drivers or at least to the application.

The second embodiment described below addresses these issues. To do this there are two major changes to the implementation:

1. The light direction vector is now specified in "X,Y,Z" fixed point coordinates. This is very similar to a typical software interface, in which the light direction vector is given in floating point coordinates. Ideally, the floating point vector will have been normalised.

2. The bump map texel directions are also now specified in Cartesian coordinates, except that one component can be eliminated due to redundancy. We thus only store "X" and "Z" per texel.

The idea of specifying bumps and light directions in a local vertex coordinate system remains the same. Converting a height map to the new format is much easier than the old, since no trigonometry is required.

Additionally, the new technique includes a 'glossiness' parameter that allows the modelling of specular highlights.

Figure 4:
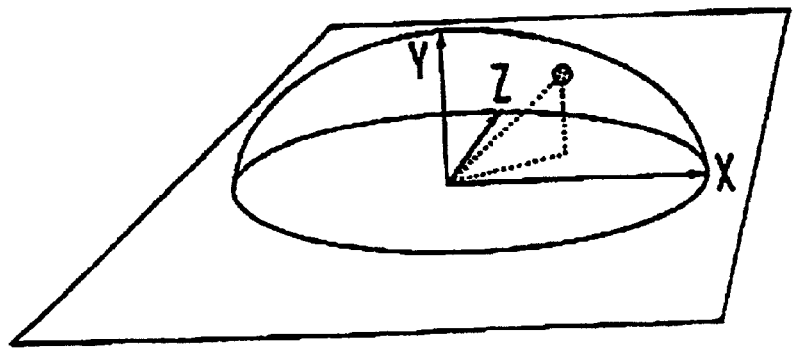
FIG. 4 is a schematic diagram showing the surface normal and a Cartesian coordinate representation system in contrast with the polar coordinates of FIG. 2.

As in the first embodiment, each texel stores the 'angle' or 'surface normal' of the bumpy surface at that particular texel, and it is assumed that the vector can lie anywhere within a hemisphere, as shown in FIG. 4.

We are not interested in the length of this vector (as it is assumed to be of unit length) only in its angle. In the first embodiment, this vector was stored using polar coordinates, however these are a nuisance to interpolate.

In the second embodiment, the vector is represented in the more usual Cartesian coordinate system. The obvious way to store this would be X,Y,Z, where Y is always positive, and X & Z are signed values, however, we are typically limited to only 16 bits. If, however, we scale the vector such that $$|x_s|+y_s+|z_s|=1$$

then there is no need to store the Y component at all, since it can be derived from the other two values. Note that this vector is no longer of unit length. Also all components of this vector are $\leq 1$ and that the length of this scaled vector is also $\leq 1$.

Expressing this in terms of a 16 bit texel, we would have the following:
UNIT 8 TexelX, TexelY;

TexelX=((int) (Xscaled*127.0f))+127;

TexelZ=((int) (Zscaled*127.0f))=127;

This packs X and Z as offset 8 bit values. That is, a value of 0 represents −127/127' while 254 represents +127/127. We use this notation rather than the usual 2's complement to make the bilinear interpolation straight-forward.

To extract the X,Y and Z components 'in the hardware', we do . . .
INT9 BumpX, BumpZ;
UINT8 BumpY;

BumpX=(TexelX−127)*2;

BumpZ=(TexelZ−127)*2;

BumpY=255−ABS(BumpX)−ABS(BumpZ);

We are guaranteed that Y is positive as (ABS(BumpX)+ABS(BumpZ))must be $\leq$255.

(The above could probably be expressed better). TexelX and TexelZ can be the results from the linear/bilinear/trilinear filtering.

One of the problems with the first embodiment is the behaviour of the bilinear filtering. With angles, there is a problem with wrapping around or taking the shortest interpolation path. This is eliminated with the X/Z scheme. The interpolation is performed with just the TexelX and TexelZ components, and the Y is calculated from the filtered result. Since these values are in the range 0 to 255, the standard RGB filtering hardware is directly applicable. For the following examples, only a linear 'filter' will be used since both bilinear and trilinear are repeated linears.

Figure 5:
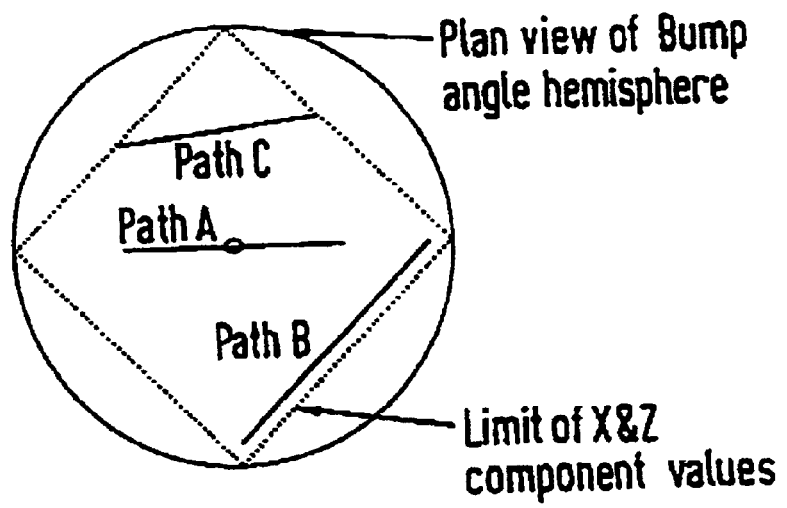
FIG. 5 shows schematically a linear filter applied to texels.

FIG. 5 shows a view from above looking down on the bump direction hemisphere. The dotted diamond shape represents the limits of the scaled X and Z values, which when renormalised with the computed Y value would stretch out to the boundary of the hemisphere. Three example linear interpolations in X and Z are shown.

For Path A, the interpolation would result in an angle that goes up and over the pole of the hemisphere—which is ideal. The previous method would have chosen a path that ran in a circle 'copying' the circumference. For Path B, the interpolation would stay close to the circumference of the hemisphere. Path C, should also result in a sensible interpolation with a rise and fall in the 'Y' component. The only likely quibble with this scheme is that the rate of change of the angle may not be constant, but this seems very minor.

To prevent loss of accuracy with fixed point implementations, it is important that the length of the vector should not decrease too greatly, since in a fixed point system, bits will be lost. In this encoding , the minimum length would occur when $|x_s|=y_s=|z_s|=\frac{1}{3}$, resulting in a length of $\frac{1}{3}$. This loses less than 2 bits of accuracy, and so is acceptable.

There are two things we must guard against. The first is that not all possible combinations of 'texel' contents are valid.

Since we have specified that $|x_s|+y_s+|z_s|=1$ a texel that has $|x_s|+|z_s|>1$ is clearly invalid. We must therefore, protect against such occurrences.

The second point is that even if the original texels are valid, there is a small chance that the bilinear unit will produce X and Z values which also just exceed these legal values.

As with the alternate bump format the light direction vector is stored in Cartesian coordinates. The only space we have available is the OffsetRGB/original-BumpK values, as an example we may have 8 bits for each of the X, Y, and Z components. These values all need to be signed, and to keep accuracy, it is assumed that the light direction vector is normalised before conversion to integer. The per-vertex values would therefore be calculated from . . .
int8 VertX, VertY, VetZ;

VertLightX=((int)(LightDir(0)*127.0f))&0xFF;

VertLightY=((int)(LightDir(1)*127.0f))&0xFF;

VertLightZ=((int)(LightDir(2)*127.0f))&0xFF;

Since we are assuming that each vertex light vector is of unit length and because we are using 'linear' interpolation, the vector for a particular pixel will have a length that is $\leq 1$. As with the bump map, it is important that the in-between vectors are not too short or else too much accuracy will be lost.

If we assume that the maximum sensible angle difference will be 120° then the shortest vector will be sin(30°)=½. We will therefore only lose about 1 bit of accuracy due to the shortening of vectors.

To have the chance of 'smooth' animation, it is important that small changes in light direction can be modelled. This will be of maximum importance near where the light direction=(0,1,0) ie. on the horizon so examining the minimum integer variation that seems possible we get [2,254,0].

This appears to be about an angle of 0.1 degrees, which seems small enough. The shading "dot product" computation is much simpler than it is with polar coordinates and is implemented in a well known manner.

To simulate glossy highlights, a 'power' function is usually applied to the dot product so that bright areas become concentrated. The typical Phong lighting model raises the dot product to an arbitrary power, but this is too expensive to implement in hardware.

A cheaper, but more than satisfactory function is to use a quadratic approximation as shown below.

Let X be the result of the dot product,

C be a 'fixed point' 8 bit concentration value, where C=0 (==0.0) gives a linear output, and C=255 (==1.0) gives maximum concentration.

We compute . . .

$k = C+8$; (k is a 9 bit value with 3 bit of fraction)

$L = MAX(0, 1023-(k*(1023-X))>>3))$; L is a 10 bit fractional value $Q = (L*L)>>10$  Q is a 10 bit fraction value $P = L + C*(Q-L)>>8$;

P is then the fixed point result of the power function. Note that $Q \leq L$ and so the final calculation will require signed maths.

In total, the highlight function will require 5 add/subtracts and 3 multiplies, although a couple of these are rather simple degenerate cases.

Thus, it will be appreciated that preferred embodiments of the present invention provide a system which enables textured surfaces to be shaded much more efficiently than has been possible.

What is claimed is:

1. A method for shading a three dimensional textured computer graphic image comprising the steps of:
   providing data defining the three dimensional computer graphic image, the image comprising a set of pixels;
   providing a set of surface normal vectors corresponding to texture data for the image, wherein the surface normal vectors are stored in a local two dimensional coordinate system, and an individual surface normal vector from the set of surface normal vectors is assigned to each pixel;
   providing data defining at least one light source and its direction illuminating the image wherein the light source is defined in the same local coordinate system; and
   for each pixel in the image, deriving a shading value to be applied to that pixel from the surface normal vector assigned to the pixel and the light source data.

2. A method according to claim 1 in which the surface normal vectors are stored in polar coordinates.

3. A method according to claim 1 in which the light source data are stored in polar coordinates.

4. A method according to claim 1 in which the step of deriving a shading value to be applied to a pixel comprises deriving a colour value and a blending value from the surface normal vector assigned to the pixel and the light source data and combining the derived colour value with existing colour data for that pixel in dependence on the blending value.

5. A method according to claim 1 in which the surface normal vectors are stored in Cartesian coordinates.

6. A method according to claim 5 in which the light source data are stored in Cartesian coordinates.

7. A method according to claim 5 in which, for each surface normal vector, only two of the Cartesian coordinates are stored.

8. A method according to claim 1 comprising the step of applying a linear filter to the texture data at least once to map values to the individual pixels.

9. A method according to claim 1 including the step of applying a glossiness parameter to a pixel.

10. Apparatus for shading a three dimensional textured computer graphic image comprising:
    means for providing data defining the three dimensional computer graphic image, the data defining pixels that comprise the image;
    means for providing a set of surface normal vectors corresponding to texture data applied to the image, wherein the surface normal vectors are stored in a local two dimensional coordinate system;
    means for providing data defining at least one light source and its direction illuminating the image wherein the direction of the light source is provided in the same local coordinate system; and
    means for deriving a shading value to be applied to each pixel in the image from the set of surface normal vectors and the light source data.

11. Apparatus according to claim 10, wherein said means for providing surface normal vectors provides the surface normal vectors in polar coordinates.

12. Apparatus according to claim 10, wherein said means for providing light source defining data provides the light source data in polar coordinates.

13. Apparatus according to claim 10, wherein said means for providing surface normal vectors provides the surface normal vectors in Cartesian coordinates.

14. Apparatus according to claim 10, wherein said means for providing light source defining data provides the light source data in Cartesian coordinates.

15. Apparatus according to claim 13, wherein said means for providing surface normal vectors, for each surface normal vector, provides only two of the Cartesian coordinates.

16. Apparatus according to claim 10 comprising means for applying a linear filter at least once to the texture data to map values onto individual pixels.

17. Apparatus according to claim 10 in which said means for deriving a shading value to be applied to a pixel comprises means for deriving a colour value and a blending value from the light source data and means for combining the colour value with an existing colour value in dependence on the blending value.

18. A method of shading a three dimensional graphics textured image comprising the steps of:
    defining a basic computer image to be textured, the computer image comprising a set of pixels, wherein, in said step of defining a basic computer image, an existing color value for each pixel is determined;
    determining whether or not the basic computer image is to be subjected to supplemental shading;
    if the basic computer image is to be subjected to supplemental shading:
       for each pixel in the basic computer image, providing a surface normal vector, wherein the surface normal vectors are in a local two dimensional coordinate system;
       providing data defining a light source and the direction from which the light source illuminates the basic computer image, wherein the data are in the same local coordinate system as the surface normal vectors;

based on the surface normal vector for a pixel and the data defining the light source and the direction from which the light source illuminates the basic computer image, generating an alpha value and a supplemental color value for the pixel; and blending the existing color value and the supplemental color value together as function of the alpha value to produce a final color value for the pixel; and if the basic computer image is not to be subjected to supplemental shading, designating the existing color value as the final color value.

19. The method of shading a three dimensional graphics textured image of claim 18, wherein:

a store contains a plurality of bump maps, each said bump map comprising a set of surface normal vectors; the surface normal vectors of a bump map varying as a function of the location of the surface normal vectors on the bump map;

if the basis computer image is to be subjected to supplemental shading, one of the bump maps in the store is retrieved and the bump map is mapped over the basic computer image; and said step of providing a surface normal vector for a pixel is performed by determining which of the bump mapped surface normal vectors is mapped over the pixel.

20. The method of shading a three dimensional graphics textured image of claim 18, wherein said step of providing a surface normal vector for a pixel is performed by retrieving the surface normal vector from a store wherein, in the store, the surface normal vector is stored in one from the following set of coordinate systems: polar coordinate system and Cartesian coordinate system.

* * * * *